(12) United States Patent
Zhang et al.

(10) Patent No.: US 8,310,965 B1
(45) Date of Patent: Nov. 13, 2012

(54) BUFFERED AUDIO SYSTEM WITH SYNCHRONIZING BUS CONTROLLER

(75) Inventors: Zhenyu Zhang, Campbell, CA (US); Sheng Lu, Fremont, CA (US); Jing Jiang, San Jose, CA (US); Victor Lin, Fremont, CA (US); Hunghsin Kuo, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 908 days.

(21) Appl. No.: 11/481,137

(22) Filed: Jul. 5, 2006

Related U.S. Application Data

(60) Provisional application No. 60/723,519, filed on Oct. 4, 2005, provisional application No. 60/810,920, filed on Jun. 6, 2006.

(51) Int. Cl.
*H04B 7/00* (2006.01)
*H04B 1/38* (2006.01)
*H04H 40/00* (2008.01)
*H04M 1/00* (2006.01)
*H04W 4/00* (2009.01)
*G06F 17/00* (2006.01)

(52) U.S. Cl. ....... 370/310; 370/328; 370/338; 455/3.06; 455/41.2; 455/550.1; 455/561; 700/94

(58) Field of Classification Search ............... 370/338, 370/310, 328; 455/414.1, 414.4, 561, 3.06, 455/41.2, 550.1; 725/131; 375/222; 700/94
See application file for complete search history.

(56) References Cited

U.S. PATENT DOCUMENTS

| | | | |
|---|---|---|---|
| 2002/0065044 A1* | 5/2002 | Ito ................................. | 455/41 |
| 2004/0185821 A1* | 9/2004 | Yuasa ........................ | 455/343.5 |
| 2005/0091052 A1* | 4/2005 | Chang et al. .................. | 704/229 |
| 2005/0138666 A1* | 6/2005 | Narusawa et al. .............. | 725/89 |
| 2005/0209719 A1* | 9/2005 | Beckert et al. .................. | 700/94 |
| 2005/0213526 A1 | 9/2005 | Malkemes et al. | |
| 2006/0036758 A1* | 2/2006 | Zhodzishsky et al. ........ | 709/233 |
| 2006/0041923 A1* | 2/2006 | McQuaide ..................... | 725/131 |
| 2006/0126651 A1* | 6/2006 | Yu ................................. | 370/404 |
| 2006/0205449 A1* | 9/2006 | Hillyard ..................... | 455/575.2 |
| 2007/0214402 A1* | 9/2007 | Heiman et al. ................ | 714/781 |
| 2007/0232222 A1* | 10/2007 | de Jong ........................ | 455/3.06 |

OTHER PUBLICATIONS

I2S Bus Specification; Phillips Semiconductors; Feb. 1986; Revised: Jun. 5, 1996; 7 pages.
Wave PCM Soundfile Format; http://ccrma.stanford.edu/courses/422/projects/WaveFormat; Mar. 8, 2006; 4 pages.
The Wave File Format; http://www.lightlink.com/tjweber/StripWav/WAVE.html; Mar. 8, 2006; 4 pages.
Wave File Format; http://www.borg.com/~jglatt/tech/wave.htm; Mar. 8, 2006; 9 pages.

* cited by examiner

*Primary Examiner* — Jean Gelin
*Assistant Examiner* — Edd Rianne Plata

(57) ABSTRACT

An audio system includes an audio client device and an access point. The audio client device includes a buffer, a clock generator, a bus controller, a bus receiver, and a control module. The buffer is configured to receive a stream of samples of audio data. The clock generator is configured to generate a first clock signal. The bus controller is configured to read samples from the buffer for transmission across a bus using the first clock signal. The bus receiver is configured to receive samples from the bus controller and output a sampling clock along with each sample. The control module is configured to analyze activity of the buffer and modify operation of the bus controller to synchronize the sampling clock with a remote sampling clock. The access point includes an audio content module, a decoding module, and a network interface that wirelessly transmits the stream of samples.

19 Claims, 12 Drawing Sheets

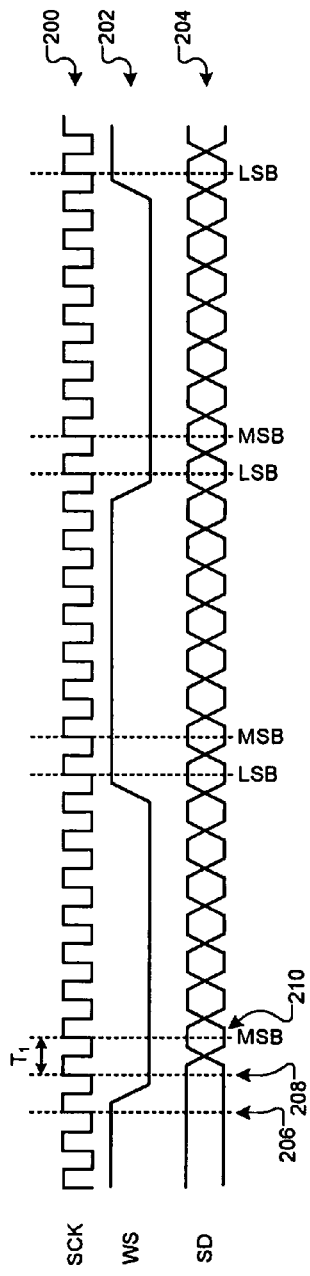
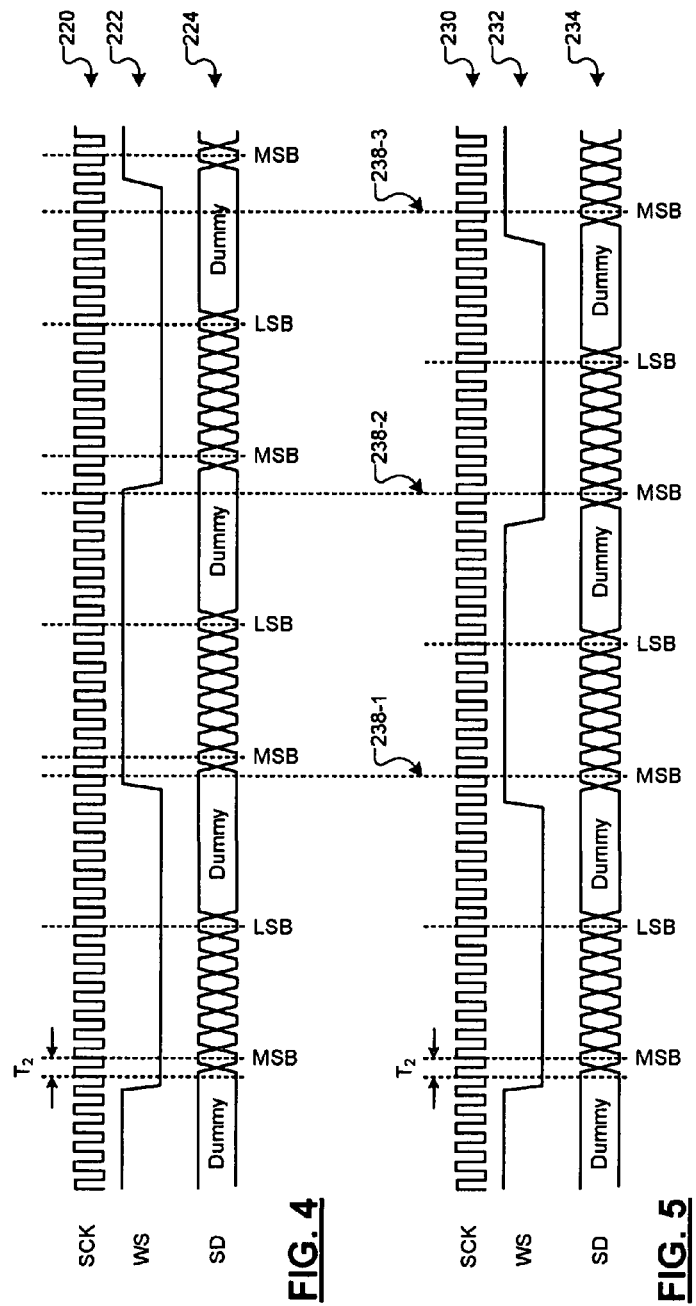
FIG. 3
FIG. 4
FIG. 5

BUFFERED AUDIO SYSTEM WITH SYNCHRONIZING BUS CONTROLLER

CROSS-REFERENCE TO RELATED APPLICATIONS

This application claims the benefit of U.S. Provisional Application No. 60/723,519, filed on Oct. 4, 2005, and U.S. Provisional Application No. 60/810,920, filed on Jun. 5, 2006, which are incorporated herein by reference in its entirety.

FIELD OF THE INVENTION

The present invention relates to transmitting media streams, and more specifically audio/video streams, over a wireless link.

BACKGROUND OF THE INVENTION

Referring now to FIG. 1, a functional block diagram of an exemplary transmission system according to the prior art is presented. The system includes an access point 102 and a client device 104. The access point 102 includes a wired Internet connection 106, an encoder 108, a processor 110, and a network interface 112. The client device 104 includes a network interface 120, a fixed-rate MP3 (MPEG layer 3) decoder 122, and a 2.5 millimeter audio jack 124. The wired Internet connection 106 receives media information from a distributed communications system such as the Internet. This media information is communicated to the processor 110, which communicates it to the encoder 108. The encoder 108 compresses the media information using a coding scheme such as MP3. The processor 110 communicates the compressed media information to the network interface 112.

The network interface 112 transmits, optionally using antenna 126, the compressed media information, which is received by the network interface 120, optionally using antenna 128, of the client device 104. The network interface 120 communicates the compressed media information to the decoder 122. The decoder 122 decodes the compressed media information and outputs the uncompressed media information to the audio jack 124. The system depicted here attempts to save power at the client device 104, which may be running on batteries, by transmitting compressed media information and therefore using as little bandwidth as possible.

SUMMARY OF THE INVENTION

An access point comprises an audio content module that generates a content signal based upon characteristics of an incoming media stream; a decoding module that decodes the incoming media stream into an uncompressed media stream at a bit rate determined by the content signal from the audio content module; and a network interface that transmits the uncompressed media stream from the decoding module.

In other features, the content signal indicates one of voice content and music content. The characteristics used by the audio content module include tags associated with the incoming media stream. The characteristics used by the audio content module include tags associated with individual portions of the incoming media stream. The characteristics used by the audio content module include frequency content of the incoming media stream. The decoding module creates the uncompressed media stream using pulse width modulation (PWM). The content signal indicates one of voice content and music content.

In further features, the decoding module uses a first sample frequency and a first number of bits per sample when the content signal indicates voice content and uses a second sample frequency and a second number of bits per sample when the content signal indicates music content, wherein the first sample frequency is less than the second sample frequency and the first number is less than the second number. The decoding module creates the uncompressed media stream in mono when the content signal indicates voice content. The decoding module creates the uncompressed media stream in stereo when the content signal indicates music content.

In still other features, a media playback system comprises the access point and a client device that communicates with the access point. The client device comprises a wireless network interface that wirelessly receives the uncompressed media stream and a digital to analog converter that converts the received uncompressed media stream to an analog signal. The client device further comprises an amplifier that amplifies the analog signal and an output module that outputs the amplified analog signal.

A method comprises generating a content signal based upon characteristics of an incoming media stream; decoding the incoming media stream into an uncompressed media stream at a bit rate determined by the content signal; and wirelessly transmitting the uncompressed media stream. The content signal indicates one of voice content and music content. The characteristics include tags associated with the incoming media stream. The characteristics include tags associated with individual portions of the incoming media stream.

In other features, the characteristics include frequency content of the incoming media stream. The uncompressed media stream is in pulse width modulation (PWM) format. The content signal indicates one of voice content and music content. The PWM format uses a first sample frequency and a first number of bits per sample when the content signal indicates voice content and uses a second sample frequency and a second number of bits per sample when the content signal indicates music content, wherein the first sample frequency is less than the second sample frequency and the first number is less than the second number.

In further features, the uncompressed media stream is mono when the content signal indicates voice content. The uncompressed media stream is stereo when the content signal indicates music content. The method further comprises wirelessly receiving the uncompressed media stream and converting the uncompressed media stream into an analog signal. The method further comprises amplifying the analog signal and outputting the analog signal.

An access point comprises audio content detecting means for generating a content signal based upon characteristics of an incoming media stream; decoding means for decoding the incoming media stream into an uncompressed media stream at a bit rate determined by the content signal from the audio content detecting means; and network interfacing means for transmitting the uncompressed media stream from the decoding means.

In other features, the content signal indicates one of voice content and music content. The characteristics used by the audio content detecting means include tags associated with the incoming media stream. The characteristics used by the audio content detecting means include tags associated with individual portions of the incoming media stream. The characteristics used by the audio content detecting means include frequency content of the incoming media stream. The decoding means creates the uncompressed media stream using pulse width modulation (PWM). The content signal indicates one of voice content and music content.

In further features, the decoding means uses a first sample frequency and a first number of bits per sample when the content signal indicates voice content and uses a second sample frequency and a second number of bits per sample when the content signal indicates music content, wherein the first sample frequency is less than the second sample frequency and the first number is less than the second number. The decoding means creates the uncompressed media stream in mono when the content signal indicates voice content. The decoding means creates the uncompressed media stream in stereo when the content signal indicates music content.

In still other features, a media playback system comprises the access point and a client device that communicates with the access point. The client device comprises wireless network interfacing means for wirelessly receiving the uncompressed media stream and digital to analog conversion means for converting the received uncompressed media stream to an analog signal. The client device further comprises amplifying means for amplifying the analog signal and outputting means for outputting the amplified analog signal.

A computer program stored for use by a processor comprises generating a content signal based upon characteristics of an incoming media stream; decoding the incoming media stream into an uncompressed media stream at a bit rate determined by the content signal; and wirelessly transmitting the uncompressed media stream. The content signal indicates one of voice content and music content. The characteristics include tags associated with the incoming media stream. The characteristics include tags associated with individual portions of the incoming media stream.

In other features, the characteristics include frequency content of the incoming media stream. The uncompressed media stream is in pulse width modulation (PWM) format. The content signal indicates one of voice content and music content. The PWM format uses a first sample frequency and a first number of bits per sample when the content signal indicates voice content and uses a second sample frequency and a second number of bits per sample when the content signal indicates music content, wherein the first sample frequency is less than the second sample frequency and the first number is less than the second number.

In further features, the uncompressed media stream is mono when the content signal indicates voice content. The uncompressed media stream is stereo when the content signal indicates music content. The computer program further comprises wirelessly receiving the uncompressed media stream and converting the uncompressed media stream into an analog signal. The computer program further comprises amplifying the analog signal and outputting the analog signal.

An audio client device comprises a buffer that receives a stream of samples of audio data; a clock generator that generates a first clock signal; a bus controller that reads samples from the buffer for transmission across a bus using the first clock signal; a bus receiver that receives samples from the bus controller and outputs a sampling clock along with each sample; and a control module that modifies operation of the bus controller to synchronize the sampling clock with a remote sampling clock based upon analysis of activity of the buffer. The control module alters a number of dummy bits transmitted by the bus controller based upon the analysis.

In other features, each audio data sample contains N bits, and the control module initially directs the bus controller to transmit a number of dummy bits equal to N. Alteration of the number of dummy bits is based upon a difference in quantity of samples received by the buffer and samples being read from the buffer. The quantity of samples received by the buffer includes samples lost prior to reaching the buffer. The buffer receives a first number of samples in a time period, a second number of samples are read from the buffer, and the number of dummy bits is decreased when the first number is greater than the second number.

In further features, a first number of samples are received by the buffer in a time period, a second number of samples are read from the buffer, and the number of dummy bits is increased when the first number is less than the second number. The buffer receives samples in blocks, each block containing P samples. P is greater than one and the bus controller reads samples from the buffer one at a time. The control module waits to modify operation of the bus controller until the buffer has received a first number of blocks. The first number is determined based upon granularity of modification of the bus controller.

In still other features, the clock generator includes a clock divider module that divides an internal clock signal by a divisor D to create the first clock signal. The control module selectively changes the divisor D to modify operation of the bus controller. The control module changes the divisor D for transmission by the bus controller of every one out of S samples, wherein S is an integer greater than one. The bus is an $I^2S$ bus, the bus controller is an $I^2S$ bus controller, and the bus receiver is an $I^2S$ bus receiver.

A method comprises buffering a stream of samples of audio data; generating a first clock signal; transmitting buffered samples across a bus using the first clock signal; outputting samples received from the bus along with a sampling clock; and modifying operation of the transmitting to synchronize the sampling clock with a remote sampling clock based upon analysis of activity of the buffering. The modifying includes altering a number of dummy bits used by the transmitting based upon the analysis.

In other features, each audio data sample contains N bits, and the transmitting initially sets the number of dummy bits equal to N. The altering is based upon a difference in quantity of samples received by the buffering and quantity of samples read by the transmitting. The quantity of samples received includes samples lost prior to the buffering. The buffering buffers a first number of samples in a time period, the transmitting reads a second number of buffered samples in the time period, and further comprising decreasing the number of dummy bits when the first number is greater than the second number.

In further features, the buffering buffers a first number of samples in a time period, the transmitting reads a second number of buffered samples in the time period, and further comprising increasing the number of dummy bits when the first number is less than the second number. The buffering is performed in blocks of samples, wherein each block contains P samples. P is greater than one, and the transmitting reads buffered samples one at a time. The modifying is performed after the buffering has received a first number of blocks.

In still other features, the method further comprises determining the first number based upon granularity of the modifying. The generating the first clock signal includes dividing an internal clock signal by a divisor D. The modifying includes selectively changing the divisor D. The modifying includes changing the divisor D for every one out of S samples transmitted by the transmitting, wherein S is an integer greater than one. The transmitting is performed using Inter-IC Sound ($I^2S$).

An audio client device comprises buffering means for receiving a stream of samples of audio data; clock generating means for generating a first clock signal; bus controlling means for reading samples from the buffering means for transmission across a bus using the first clock signal; bus receiving means for receiving samples from the bus controlling means and outputting a sampling clock along with each sample; and controlling means for modifying operation of the bus controlling means to synchronize the sampling clock with a remote sampling clock based upon analysis of activity of the buffering means. The controlling means alters a number of dummy bits transmitted by the bus controlling means based upon the analysis.

In other features, each audio data sample contains N bits, and the controlling means initially directs the bus controlling means to transmit a number of dummy bits equal to N. Alteration of the number of dummy bits is based upon a difference in quantity of samples received by the buffering means and samples being read from the buffering means. The quantity of samples received by the buffering means includes samples lost prior to reaching the buffering means. The buffering means receives a first number of samples buffering means in a time period, a second number of samples are read from the buffering means, and the number of dummy bits is decreased when the first number is greater than the second number.

In further features, a first number of samples are received by the buffering means in a time period, a second number of samples are read from the buffering means, and the number of dummy bits is increased when the first number is less than the second number. The buffering means receives samples in blocks, each block containing P samples. P is greater than one and the bus controlling means reads samples from the buffering means one at a time. The controlling means waits to modify operation of the bus controlling means until the buffering means has received a first number of blocks. The first number is determined based upon granularity of modification of the bus controlling means.

In still other features, the clock generating means includes clock dividing means for dividing an internal clock signal by a divisor D to create the first clock signal. The controlling means selectively changes the divisor D to modify operation of the bus controlling means. The controlling means changes the divisor D for transmission by the bus controlling means of every one out of S samples, wherein S is an integer greater than one. The bus is an I²S bus, the bus controlling means is an I²S bus controlling means, and the bus receiving means is an I²S bus receiving means.

A computer program stored for use by a processor comprises buffering a stream of samples of audio data; generating a first clock signal; transmitting buffered samples across a bus using the first clock signal; outputting samples received from the bus along with a sampling clock; and modifying operation of the transmitting to synchronize the sampling clock with a remote sampling clock based upon analysis of activity of the buffering. The modifying includes altering a number of dummy bits used by the transmitting based upon the analysis.

In other features, each audio data sample contains N bits, and the transmitting initially sets the number of dummy bits equal to N. The altering is based upon a difference in quantity of samples received by the buffering and quantity of samples read by the transmitting. The quantity of samples received includes samples lost prior to the buffering. The buffering buffers a first number of samples in a time period, the transmitting reads a second number of buffered samples in the time period, and further comprising decreasing the number of dummy bits when the first number is greater than the second number.

In further features, the buffering buffers a first number of samples in a time period, the transmitting reads a second number of buffered samples in the time period, and further comprising increasing the number of dummy bits when the first number is less than the second number. The buffering is performed in blocks of samples, wherein each block contains P samples. P is greater than one, and the transmitting reads buffered samples one at a time. The modifying is performed after the buffering has received a first number of blocks.

In still other features, the computer program further comprises determining the first number based upon granularity of the modifying. The generating the first clock signal includes dividing an internal clock signal by a divisor D. The modifying includes selectively changing the divisor D. The modifying includes changing the divisor D for every one out of S samples transmitted by the transmitting, wherein S is an integer greater than one. The transmitting is performed using Inter-IC Sound (I²S).

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is an exemplary timing diagram of an I²S bus;

FIG. 4 is an alternate exemplary timing diagram of an I²S bus;

FIG. 5 is an exemplary timing diagram of an I²S bus with one fewer dummy bit;

DETAILED DESCRIPTION OF THE PREFERRED EMBODIMENTS

Figure 1:
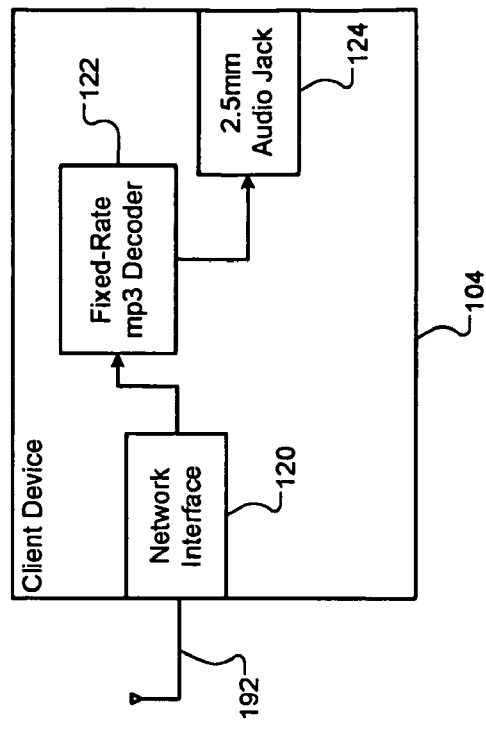
FIG. 1 is a functional block diagram of an exemplary transmission system according to the prior art.
Figure 1:
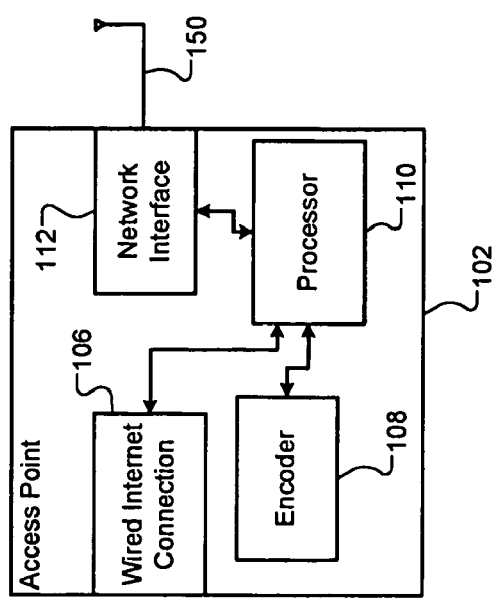

The following description of the preferred embodiments is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present invention.

Figure 2A:
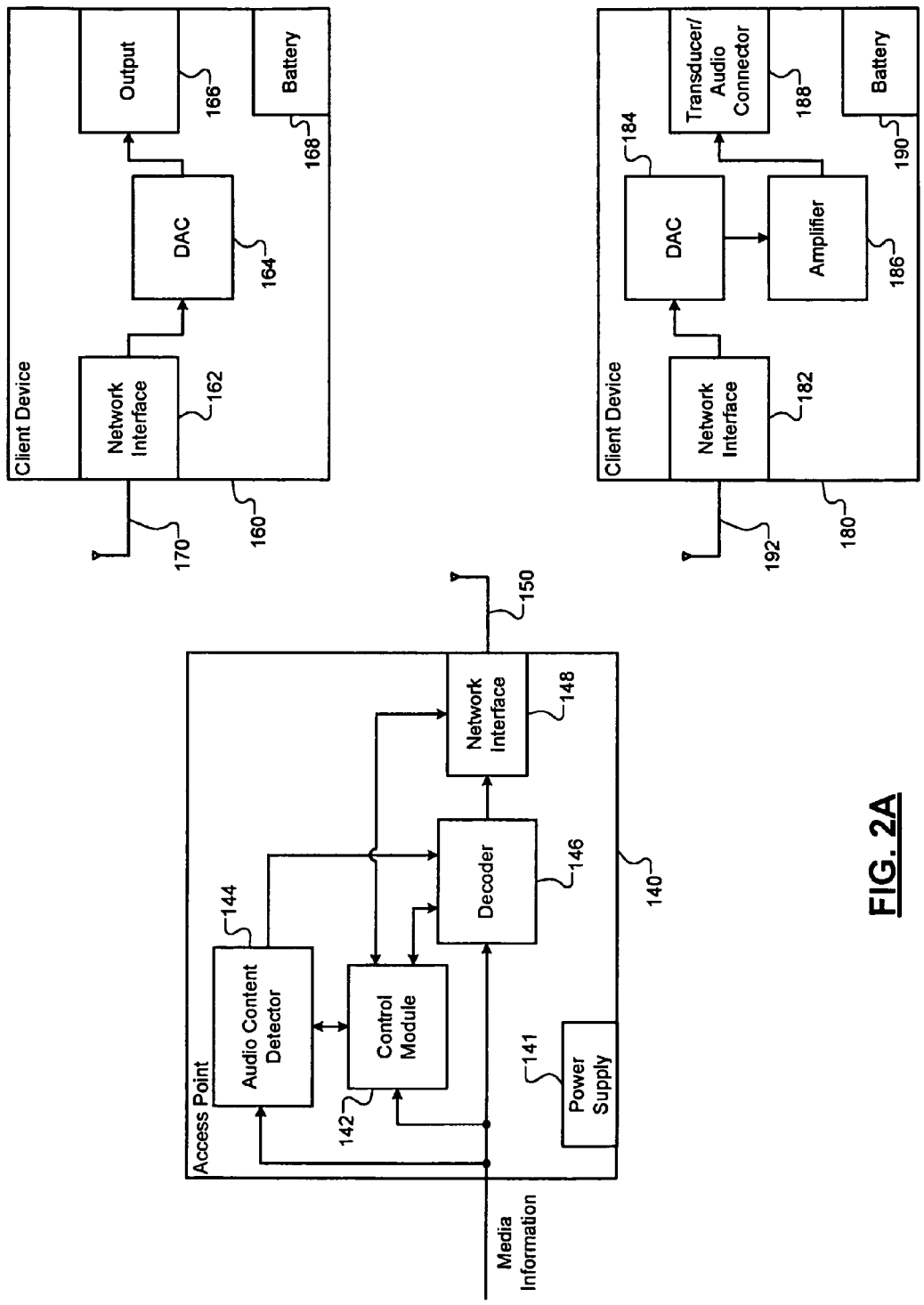
FIG. 2A is a functional block diagram of a power sensible media transmission scheme.

Referring now to FIG. 2A, a functional block diagram of a power sensible media transmission scheme is depicted. An access point 140 includes a power supply 141, a control module 142, an audio content detector 144, a decoder 146, and a network interface 148. The network interface 148 may communicate using an antenna 150. The power supply 141 receives line power, such as from a wall receptacle or from Power over Ethernet, and powers the control module 142, the audio content detector 144, the decoder 146, and the network interface 148.

The control module 142 receives media information, such as audio and/or video information. The source of media information is discussed in more detail with respect to FIGS. 2B-2E. The audio content detector 144 and decoder 146 also receive the media information. The control module 142 communicates with the audio content detector 144, a decoder 146, and the network interface 148. The audio content detector 144 determines characteristics of the media information. Based on these characteristics, the audio content detector 144 communicates a control signal to the decoder 146.

The decoder 146 communicates decoded media information to the network interface 148. The decoder 146 converts incoming media information into a format that requires little or no decoding, such as PCM (Pulse Code Modulation). Based on the control signal from the audio content detector 144, the decoder 146 varies the bit rate of information outputted to the network interface 148. For instance, high fidelity music may require more bandwidth than voice data; CD quality music may require 44.1 kHz of 16-bit stereo samples, while voice may only require 11.025 kHz of 8-bit mono (or monophonic; i.e., one channel, as compared to stereo, which uses two channels) samples. Alternately, voice may require 8 kHz of 8-bit mono samples.

When the audio content detector 144 determines that CD quality music is being transmitted, the decoder 146 may output 44.1 kHz PCM, in stereo, with eight bits per sample. This simple PCM data requires little to no processing capability on the part of client devices. Bandwidth requirements are attenuated by transmitting only the bandwidth required by the given media signal. This structure allows client devices to save power by eliminating the need for a DSP (digital signal processor) or other decoding device, while still limiting the bandwidth as much as possible.

The audio content detector 144 may function in a number of ways. The audio content detector 144 may analyze the time domain data or frequency spectrum of the media information to determine characteristics of the media information. The audio content detector 144 may also analyze tags stored with an incoming media file, such as MP3 tags, including ID3 and/or APEv2 tags. Files conforming to such formats as the RIFF (Resource Interchange File Format) format, and more specifically to the WAV (WAVeform audio format) format, are stored as sequences of portions. Each portion may be marked with a tag indicating the type of data that the portion contains. The audio content detector 144 can then instruct decoder 146 to transmit portions of the WAV file at a high frequency and resolution for those portions of the WAV file that are music, and at a lower frequency and/or resolution for those portions that are voice.

A first client device 160 includes a network interface 162, a digital to analog converter (DAC) 164, an output module 166, and a battery 168. The battery 168 provides power to the components of the client device 160, and the network interface 162 may communicate via an antenna 170. The network interface 162 receives uncompressed media information and communicates this information to the DAC 164. An analog output of the DAC 164 is communicated outside of the client device 160 by the output module 166. A second exemplary client device 180 includes a network interface 182, a DAC 184, an amplifier 186, a transducer/audio connector 188, and a battery 190. The battery 190 provides power to the components of the second client device 180, and the network interface 182 may communicate using an antenna 192.

The network interface 182 communicates media information to the DAC 184, which outputs an analog signal to the amplifier 186. The amplifier 186 amplifies the signal and communicates it to the transducer/audio connector 188. The transducer/audio connector 188 may be a transducer, such as a speaker, or may be an audio connector, such as a headphone jack or RCA connectors. The DAC 184 may be clocked based on the sample frequency of the incoming media. Alternatively, the DAC 184 may have a constant clock, while a buffer within the network interface 182 holds each incoming sample at its output for more than one clock cycle. For example, if the current incoming sample rate is one-fourth of the maximum sample rate, the clock for the DAC 184 may be set at the maximum sample rate, and the network interface 182 will hold each sample for four clock cycles.

Figure 2B:
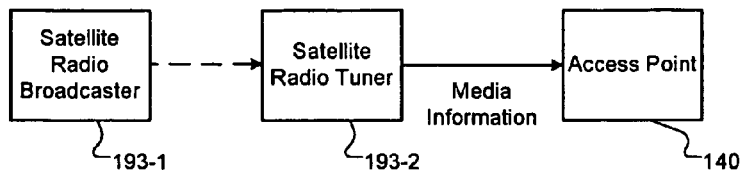
FIG. 2B is an exemplary functional block diagram of media information received via satellite radio.

The media information received by the access point 140 may come from an over-the-air source, a hard drive, the Internet, etc. Referring now to FIG. 2B, an exemplary functional block diagram of media information received via satellite radio is presented. A satellite radio broadcaster 193-1 broadcasts an encoded media stream. A satellite radio tuner 193-2 receives the encoded media stream, converts it to baseband, and communicates the media information encapsulated therein to the access point 140.

Figure 2C:
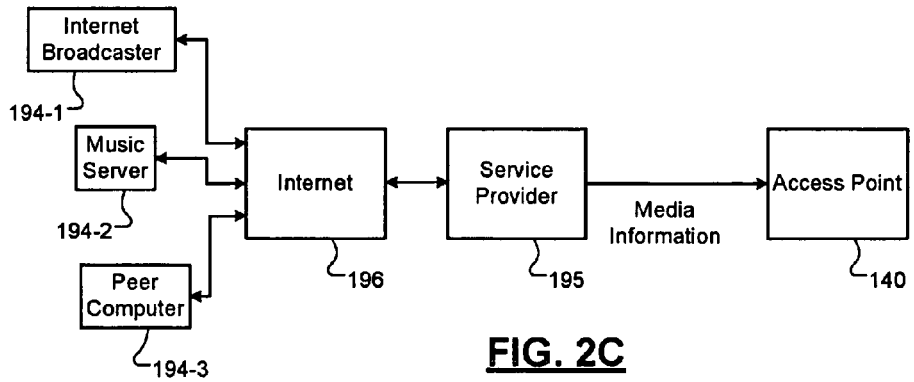
FIG. 2C is an exemplary functional block diagram of media information received via the Internet.

Referring now to FIG. 2C, an exemplary functional block diagram of media information received via the Internet is presented. An Internet broadcaster 194-1, a music server 194-2, and a peer computer 194-3 communicate with a service provider 194-4 via the Internet 194-5. The service provider communicates media information to the access point 140. The Internet broadcaster 194-1 may be, for example, an Internet radio station or a streaming multicast shared with a TV or radio broadcaster. The music server 194-2 may be an online music service such as Napster or iTunes. Media information may be obtained from the peer computer 194-3 via peer-to-peer software, such as BitTorrent or Kazaa, or by client-server file transfer, such as FTP (file transfer protocol).

Figure 2D:
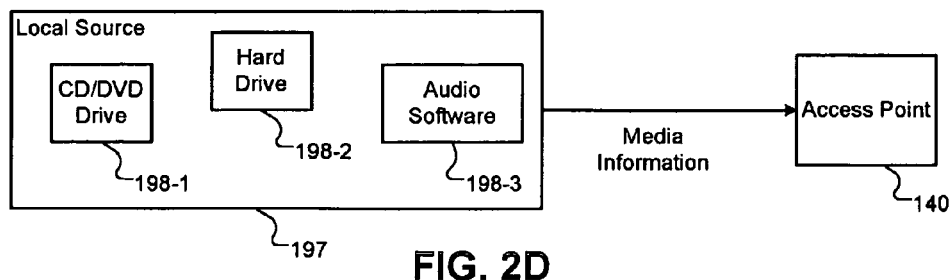
FIG. 2D is an exemplary functional block diagram of media information received from a local source.

Referring now to FIG. 2D, an exemplary functional block diagram of media information received from a local source is presented. The local source 197 may include a CD/DVD drive

198-1, a hard drive 198-2, and/or audio software 198-3. The CD/DVD drive 198-1 may contain music and/or video discs, or may be audio discs from which media information is obtained. Audio software 198-3 may include a MIDI sequencer (Musical Instrument Digital Interface) or studio audio creation software such as Sound Forge. The local source transmits media information to the access point 140. The access point 140 and local source 197 may be combined within a single device, sharing a single chassis.

Figure 2E:
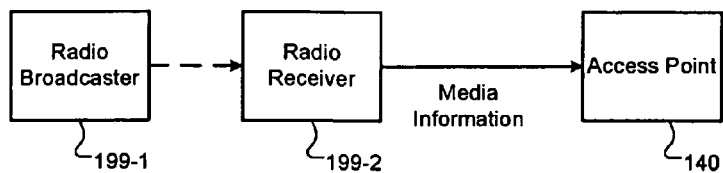
FIG. 2E is an exemplary functional block diagram of media information received from a radio broadcaster.

Referring now to FIG. 2E, an exemplary functional block diagram of media information received from a radio broadcaster is presented. A radio broadcaster 199-1 broadcasts a media stream using a modulation scheme such as AM or FM. A radio receiver 199-2 receives the media stream, demodulates it to baseband, and communicates the media information to the access point 140.

Referring now to FIG. 3, an exemplary timing diagram of an exemplary serial bus is depicted. The serial bus may have characteristics including a clock signal, a data signal, and a delineation signal that indicates when the data signal transmits valid data. Such a serial bus is the I²S (Inter-IC Sound) bus. Philips Semiconductors I²S Bus Specification, revised Jun. 5, 1996 is incorporated herein by reference in its entirety. The I²S bus includes a clock, SCK 200, a word select line, WS 202, and a serial data line, SD 204. SCK 200 has a period indicated by $T_1$. The I²S bus specification dictates that in the clock cycle following a clock cycle where WS 202 has changed state, the MSB (most significant bit) of a word will be transmitted on SD 204. The remaining bits of the word to be transmitted on SD 204 are sent in decreasing order of significance, until the LSB (least significant bit) is sent.

In the example of FIG. 3, WS 202 is high in clock cycle 206, as sampled by the rising edge of SCK 200. At the next rising edge 208 of SCK 200, WS 202 has changed to a low state. This indicates that at the following rising edge 210 of SCK 200, the MSB of a word will be asserted on SD 204. In the example of FIG. 3, there are eight bits in each word, and the MSB of one word occurs in the clock cycle following the LSB of the previous word. This may not always be the case—there may be one or more clock cycles after the LSB of a word before the following MSB is indicated by WS 202 changing state.

Referring now to FIG. 4, an alternate exemplary timing diagram of an I²S bus is depicted. The I²S bus includes SCK 220, WS 222, and SD 224. The period of SCK 220 is $T_2$, which is half of $T_1$ of FIG. 3. Because the period of SCK 220 is halved, edges of WS 222 occur more quickly in order to fall between rising edges of SCK 220. The words transmitted on SD 224 still contain eight bits, and WS 222 has the same period as WS 202 of FIG. 3. Because SCK 220 is twice as fast, the word is transmitted on SD 224 in half of the time, and the remaining bits until the following word begins are dummy bits. In this example, there are eight dummy bits, the values of which are irrelevant. If it is desired that the words be transmitted slightly faster, one fewer dummy bit can be included. The transition on WS 222 would thus occur one clock cycle earlier, and the MSB of one word would be one cycle closer to the LSB of the previous word. This situation is depicted in FIG. 5.

Referring now to FIG. 5, an exemplary timing diagram of an I²S bus having one fewer dummy bit than FIG. 4 is depicted. The I²S bus includes SCK 230, WS 232, and SD 234. SD 234 transmits eight bits of a word, followed by seven dummy bits, followed by eight bits of the next word. Transmitting one fewer dummy bit causes the MSB of the following word to occur one clock cycle earlier than if there were eight dummy bits as in FIG. 4. For instance, an MSB indicated by 238-1 occurs one clock cycle earlier than the corresponding MSB of FIG. 4. MSB 238-2 occurs two clock cycles earlier, while MSB 238-3 occurs three cycles earlier. With eight word bits and eight dummy bits, the removal of one dummy bit produces a $\frac{1}{16}^{th}$ change in the effective data rate. If each word was 32 bits (corresponding to two 16-bit audio samples) and an equal number of dummy bits were used, each dummy bit would produce a $\frac{1}{64}^{th}$ change in the data rate. This property may be used to finely change the data rate without having to vary SCK 230.

Figure 6:
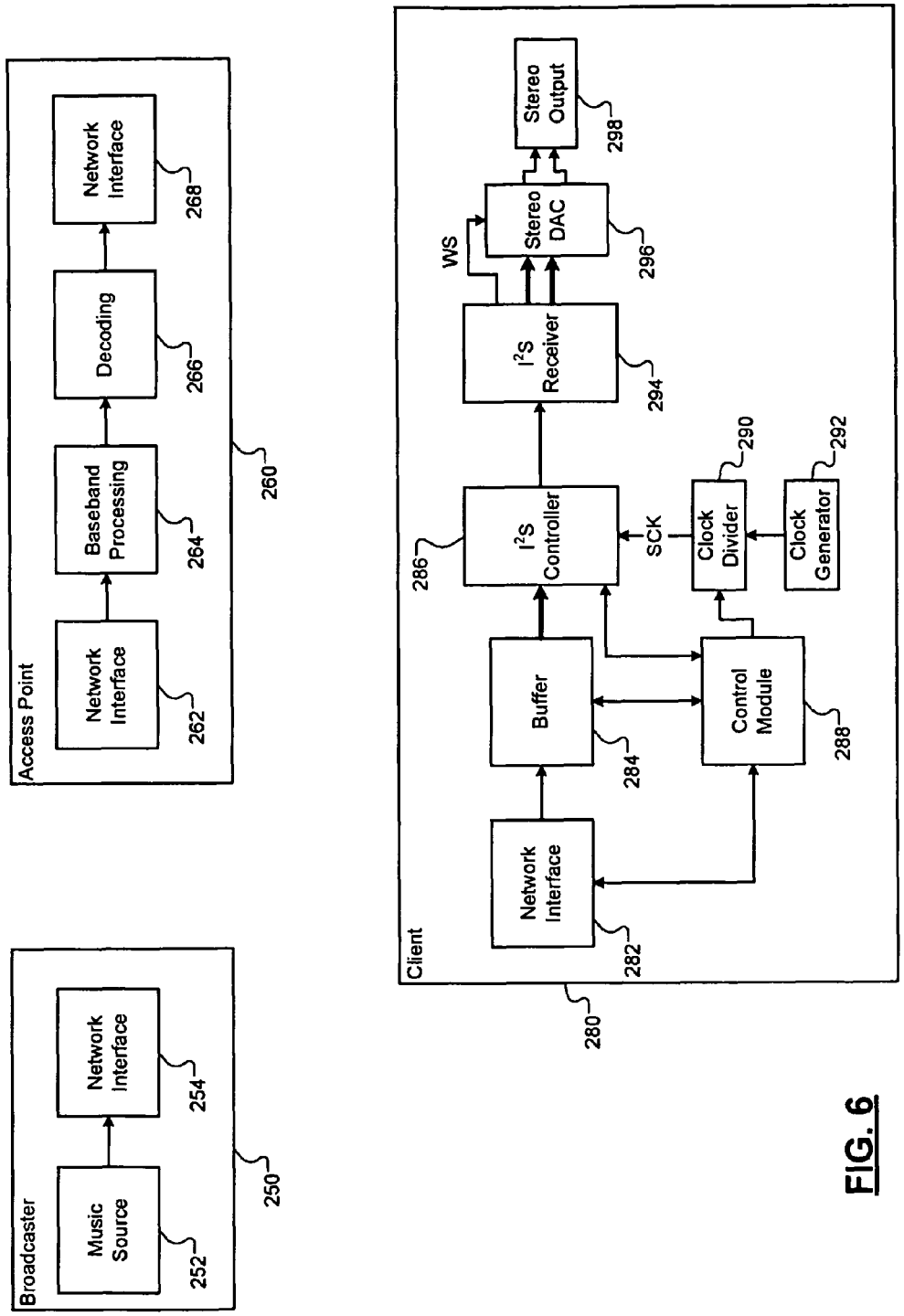
FIG. 6 is a functional block diagram of an exemplary system employing a clock compensation scheme according to the principles of the present invention.

Referring now to FIG. 6, a functional block diagram of an exemplary system employing a clock compensation scheme according to the principles of the present invention is presented. A broadcaster 250 includes a music source 252 and a network interface 254. The music source 252 may include CDs, hard-drive-based files, and/or any other suitable media. This media information is transmitted by the network interface 254. The network interface 254 may be a satellite uplink in the case of satellite broadcasting. An access point 260 includes a network interface 262, a baseband processing module 264, a decoding module 266, and a network interface 268. The network interface 262 receives media information, such as from the broadcaster 250.

The network interface 262 may receive wireless Ethernet (such as IEEE 802.11), satellite, or other over-the-air programming. The network interface 262 outputs information to the baseband processing module 264, which performs functions such as error correction and noise shaping. The baseband processing module 264 communicates an output to the decoding module 266, which may decode incoming media data encoded with such algorithms as advanced audio coding (AAC) or advanced multi-band excitation (AMBE). The decoding module 266 then outputs data to the network interface 268, which transmits the data using any appropriate communications method, such as IEEE 802.11.

A client device 280 includes a network interface 282. The network interface 282 may receive media information from the network interface 268 of the access point 260 or may receive information directly from the network interface 254 of the broadcaster 250. The network interface 282 communicates received information to a buffer 284. Media information may be received by the network interface 282, and thereby transmitted to the buffer 284, in blocks. These blocks may contain fragments of audio information of fixed time length. For instance, XM satellite radio transmits 10 milliseconds of audio data (i.e., 441 samples for 44.1 kHz data) in each block. Blocks may also be created to conform to minimum transmission requirements of the network interface 282. Each block is then loaded into the buffer 284, possibly in rapid succession or even at a single time.

The buffer 284 communicates with an I²S controller 286. A control module 288 communicates with the network interface 282, the buffer 284, the I²S controller 286, and a clock divider 290. The clock divider 290 receives signals from a clock generator 292 and outputs a divided clock, SCK, to the I²S controller 286. The clock divider 290 may not be necessary in some implementations, and the clock generator 292 would then communicate directly with the I²S controller 286. The I²S controller 286 reads samples from the buffer 284 and transmits them across an I²S bus to an I²S receiver 294. The I²S receiver 294 outputs data to a digital to analog converter (DAC) 296.

The DAC 296 may be a stereo DAC, and therefore may receive two parallel streams of data from the I²S receiver 294. The stereo DAC 296 also receives a word select line, WS, from the I²S receiver 294. WS serves as the clock for the DAC 296. Alternatively, a version of WS doubled in frequency may serve as the clock for the DAC 296. This can be accomplished by clocking the DAC 296 on both the rising and falling edges of WS. An output of the DAC 296 is communicated to an output module 298, which, if the DAC 296 is stereo, will likely also be stereo.

In order to make the clock generator 292 easy to implement, instead of attempting to finely control the frequency of SCK, the number of dummy bits inserted by the I²S controller 286 can be varied by the control module 288. Transmitting fewer dummy bits creates less gap between samples, and therefore increases the rate at which samples are removed from the buffer 284. This is functionally similar to increasing the frequency of SCK and leaving the number of dummy bits unchanged. Varying the number of dummy bits will change the period of WS (used to sample the DAC 296), and therefore will change the playback frequency. This may be desired to align the playback frequency of the DAC 296 with the source of the media information, such as the broadcaster 250 or with the access point 260.

Figure 7A:
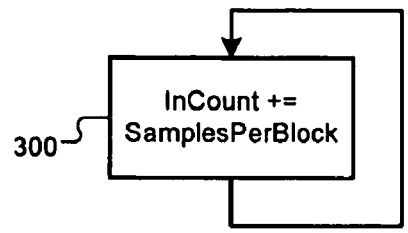
FIG. 7A is a flowchart depicting exemplary operation of inbound sample counting.

Referring now to FIG. 7A, a flowchart depicts exemplary operation of inbound sample counting. The number of samples received by the buffer 284 can be used to estimate the clock drift between the local WS clock and the remote sample clock (i.e., the sample clock of the transmitting music source). InCount represents the number of samples received by the buffer 284 of FIG. 6 since clock drift was last determined. In step 300, InCount is incremented by the value SamplesPerBlock. Because the buffer 284 may receive samples in blocks, InCount is incremented by the number of samples in each block. Control repeats with step 300, where InCount is incremented by SamplesPerBlock when the next block is added to the buffer 284.

Figure 7B:
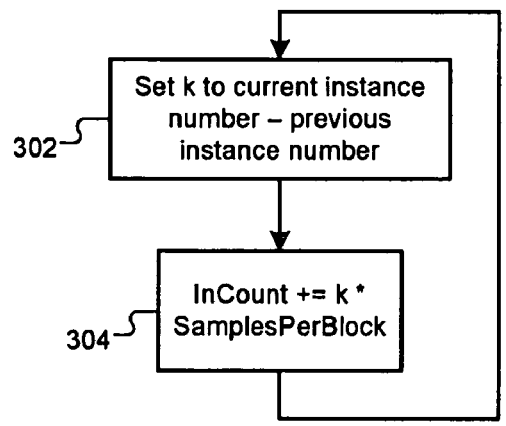
FIG. 7B is a flowchart depicting exemplary alternative operation of inbound sample counting.

Referring now to FIG. 7B, a flowchart depicts exemplary alternative operation of inbound sample counting. If each block received by the network interface 282 of FIG. 6 contains a consecutive instance number, control can determine if blocks have been lost in communication (or decoded unsatisfactorily and therefore discarded). In step 302, a variable k is set to the current block instance number minus the previous block instance number. If no blocks have been lost, the current instance number will be one greater than the previous instance number, and k will be set to one.

Control continues in step 304 where InCount is incremented by k*SamplesPerBlock. If, for example, a single block was lost prior to the current block, the current instance number will be two greater than the previous instance number, making k equal to 2. InCount is therefore incremented by the number of samples in each block the buffer should have received, even though some may have been lost. Control then returns to step 302.

Figure 7C:
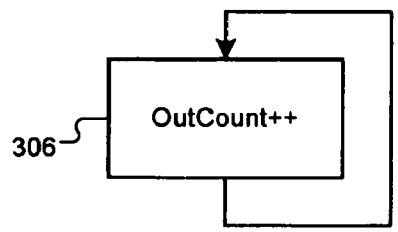
FIG. 7C is a flowchart depicting exemplary operation of outbound sample counting.

Referring now to FIG. 7C, a flowchart depicts exemplary operation of outbound sample counting. In step 306, OutCount is incremented by one. OutCount represents the number of samples removed from the buffer 284 by the I²S controller 286. Samples may be removed individually by the I²S controller 286, and therefore OutCount is incremented by one. If I²S controller 286 removes multiple samples from the buffer 284 at once, OutCount will be incremented by that number of samples. Control repeats at step 306, where OutCount is incremented when the next sample is removed from the buffer 284.

Figure 8:
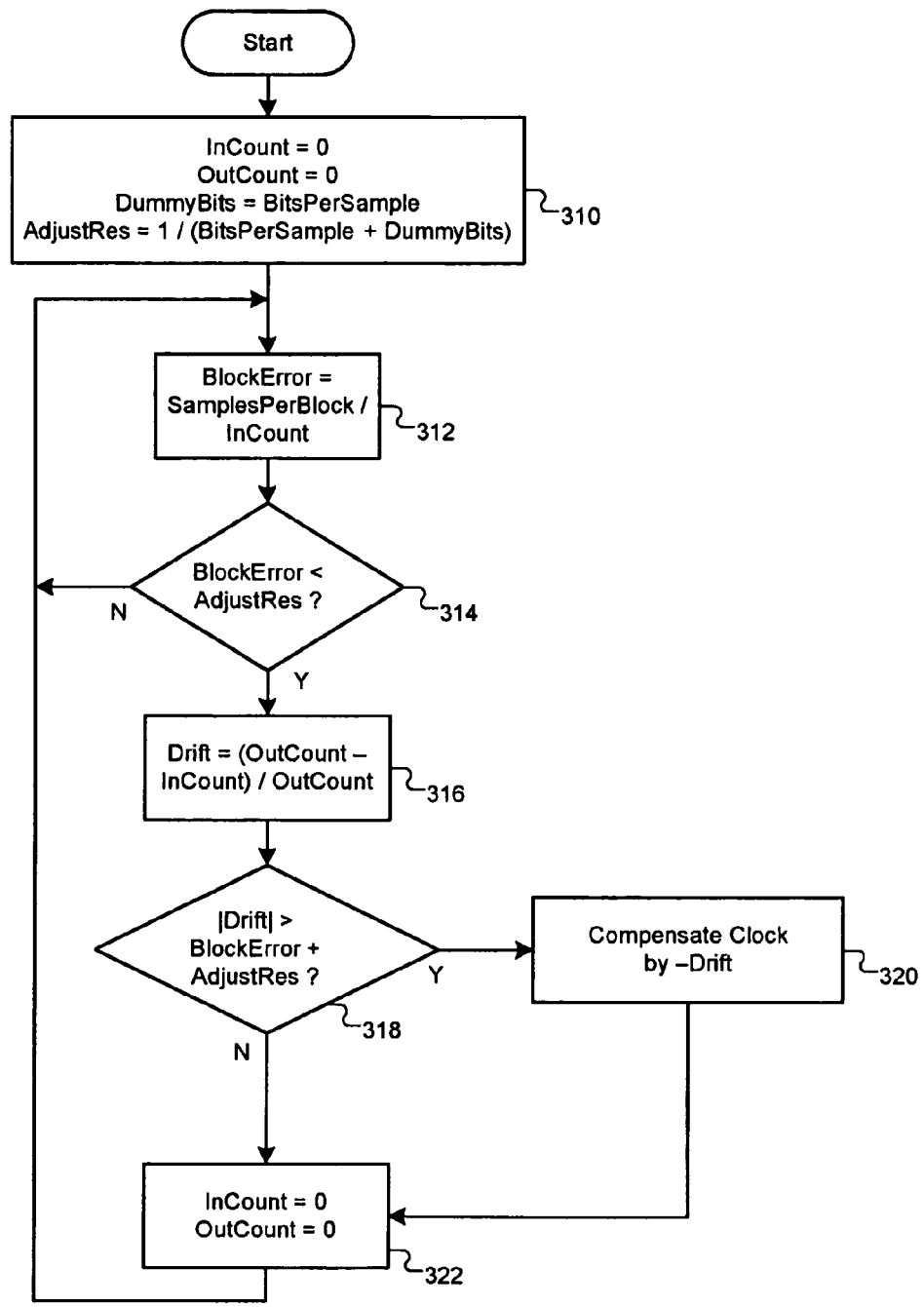
FIG. 8 is a flowchart depicting exemplary steps taken to determine clock drift.

Referring now to FIG. 8, a flowchart depicting exemplary steps taken to determine clock drift is presented. Control begins in step 310, where InCount is set to 0, OutCount is set to 0, DummyBits is set to BitsPerSample, and AdjustRes is set to 1/(BitsPerSample+DummyBits). InCount represents the number of samples received by the buffer since clock drift was last determined. OutCount represents the number of samples removed from the buffer by the I²S controller since clock drift was last determined. BitsPerSample represents the number of bits contained in each sample. For instance, a stereo 16-bit source implies that BitsPerSample is 32, while a mono 8-bit source implies 8.

DummyBits is the number of bits to be added by the I²S controller 286 between an LSB of one word and the MSB of the next word. DummyBits may initially be set to any number. When there are an equal number of dummy bits and sample bits, the frequency of SCK generated will be half that of SCK generated in the absence of dummy bits. AdjustRes is the amount by which the clock can be changed by adding or removing a single dummy bit. SamplesPerBlock is the number of samples contained within each block transmitted to the network interface. For instance, if a block contains 10 milliseconds of 44.1 kHz audio, there are likely 441 samples in each block.

Control transfers to step 312, where BlockError is set to SamplesPerBlock/InCount. Control continues in step 314, where BlockError is compared to AdjustRes. If BlockError is less than AdjustRes, control continues in step 316; otherwise control returns to step 312. BlockError is a representation of the uncertainty in InCount due to the fact that InCount is incremented in large intervals. As InCount increases, BlockError decreases. Once BlockError is low enough, meaning that a single extra block received will not significantly alter the analysis, clock drift can be determined. The buffer may be able to store more than eight blocks of data to allow enough room for this algorithm to work.

In step 316, Drift is computed by subtracting InCount from OutCount, and dividing the result by OutCount. Control then continues in step 318, where the absolute value of Drift is compared to the sum of BlockError and AdjustRes. If the absolute value of Drift is greater than BlockError plus AdjustRes, control transfers to step 320; otherwise control transfers to step 322.

In step 320, the absolute value of Drift is greater than the sum of BlockError and AdjustRes; therefore, the clock is beyond tolerance and may be compensated. A positive value of Drift means that more samples are being removed from the buffer than are being placed into it, and so the clock that removes samples from the buffer must be slowed. The clock is therefore compensated by the opposite of Drift. Control then continues in step 322, where InCount and OutCount are set to zero. Control then returns to step 312.

Figure 9:
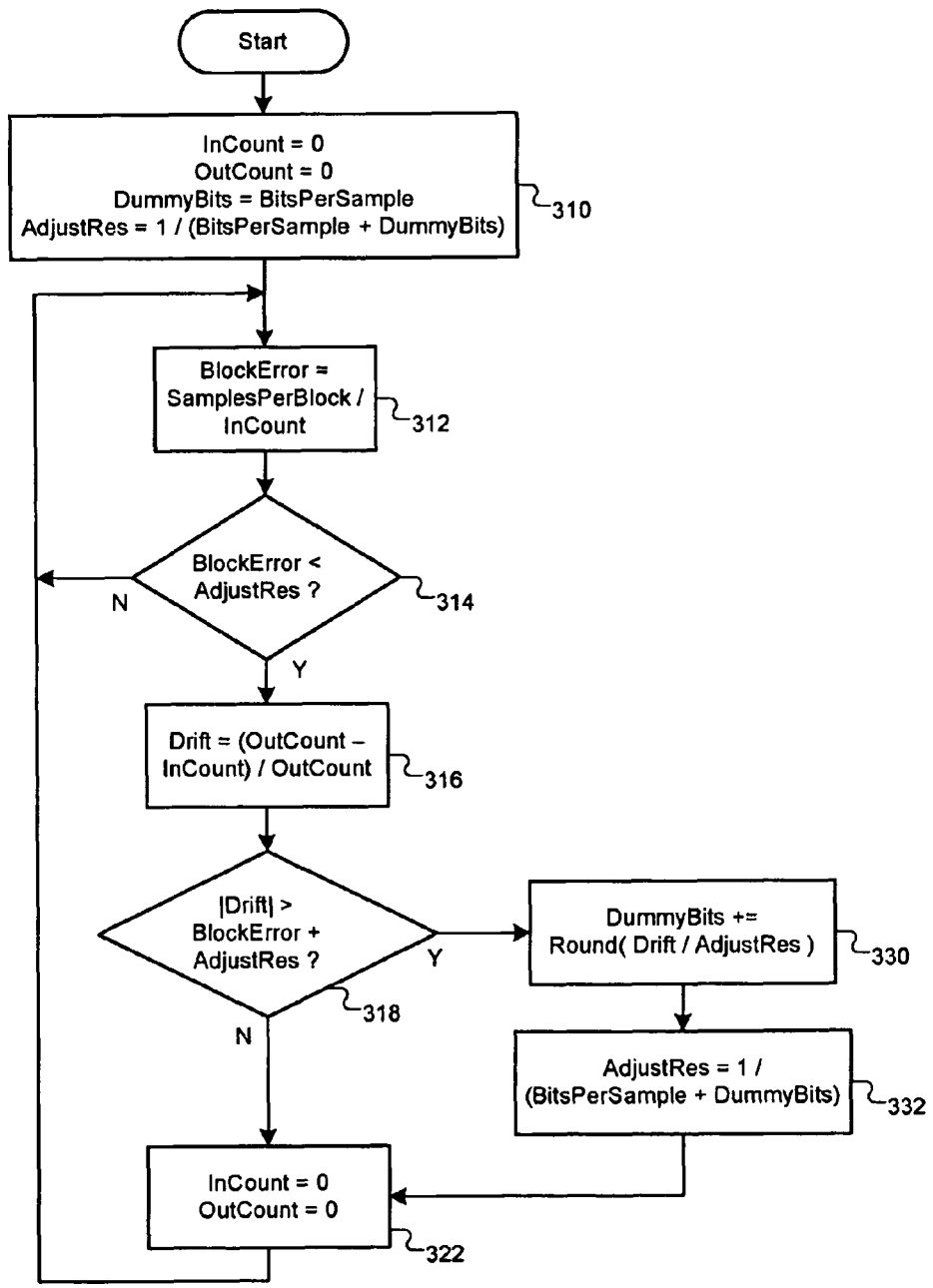
FIG. 9 is a flowchart depicting exemplary operation of the control module when compensating the clock by using dummy bits.

Referring now to FIG. 9, a flowchart depicts exemplary operation of the control module when compensating the clock by using dummy bits. The steps of FIG. 8 are represented in FIG. 9, except that step 320 is replaced with step 330, and control transfers from step 330 to step 332 before continuing to step 322. In step 330, the number of dummy bits is increased by Drift divided by AdjustRes, rounded to the nearest integer.

If Drift is equal to 1/64, for every 64 samples removed from the buffer, only 63 samples have been received. If AdjustRes is 1/64 (such as the case where each sample has 32 bits and 32 dummy bits are being used), Drift divided by AdjustRes is equal to 1. The number of DummyBits is therefore increased by one, which slows the removal of samples from the buffer. Control transfers to step 332, where AdjustRes is updated, based on the new number of DummyBits, to 1/(BitsPerSample+DummyBits). Updating AdjustRes may be omitted, and reasonable accuracy will still be maintained if DummyBits does not vary greatly. Control then continues in step 322.

Figure 10:
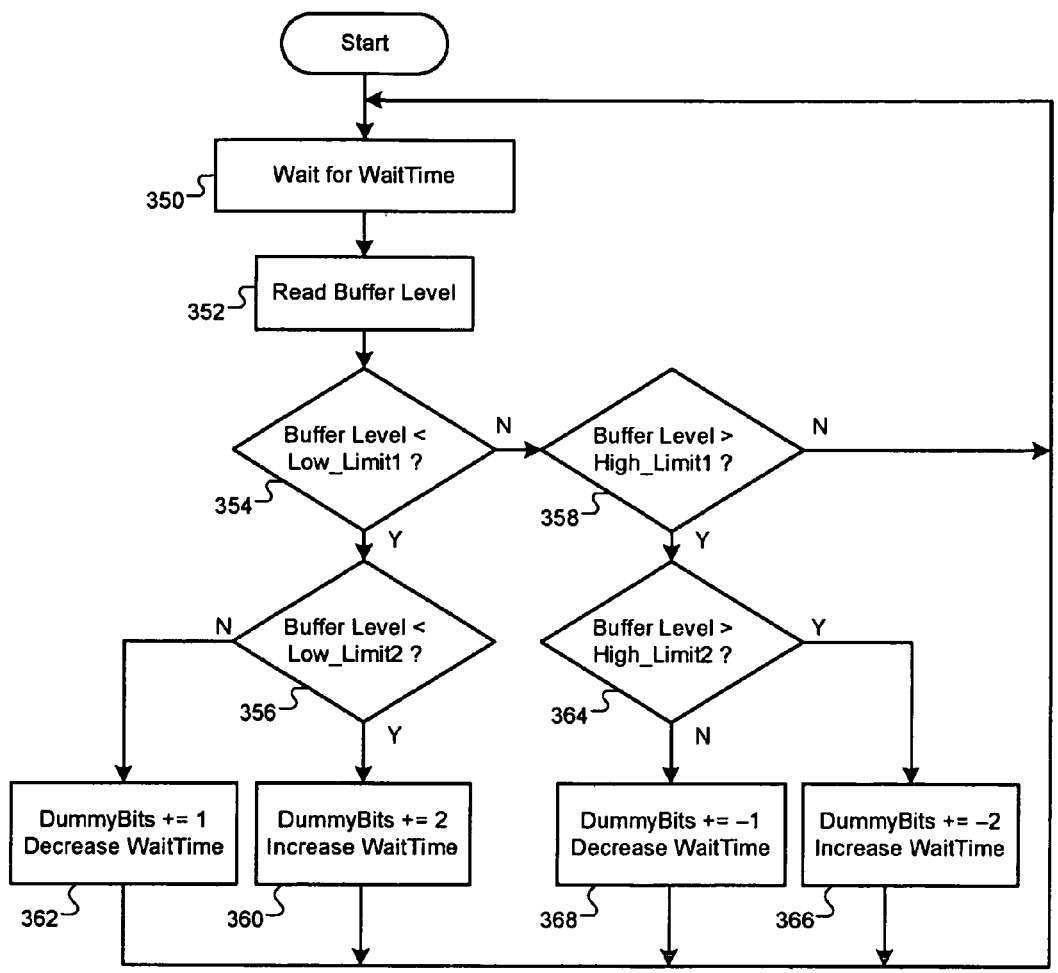
FIG. 10 is an exemplary flowchart depicting alternative operation of the control module in compensating for clock drift.

Referring now to FIG. 10, an exemplary flowchart depicts alternative operation of the control module in compensating for clock drift. Control begins in step 350, where control waits for a period of time specified by the parameter WaitTime. WaitTime may initially be set so as to allow the buffer 284 of FIG. 6 to partially fill. Control continues in step 352, where the level of buffer 284 is read. Control continues in step 354, where, if the buffer level is less than Low_Limit1, control transfers to step 356; otherwise control transfers to step 358. In step 356, if the buffer level is less than a second limit, Low_Limit2, control transfers to step 360; otherwise control transfers to step 362.

In step 358, if the buffer level is greater than High_Limit1, control transfers to step 364; otherwise control returns to step 350. In step 364, if the buffer level is greater than High_Limit2, control transfers to step 366; otherwise control transfers to step 368. Low_Limit2 is less than Low_Limit1, and High_Limit2 is greater than High_Limit1. In step 362, the number of dummy bits is incremented by 1, and WaitTime is decreased. Control then returns to step 350. In step 360, the buffer level is even lower, so the number of dummy bits is increased by 2 and WaitTime is increased. Control then returns to step 350. In step 368, the number of dummy bits is decreased by 1 and WaitTime is decreased. Control then returns to step 350. In step 366, the number of dummy bits is decreased by 2 and WaitTime is increased. Control then returns to step 350.

WaitTime is increased when the amount of change in DummyBits is greater. This allows more time for the buffer level to respond to the larger change in DummyBits. When the change in DummyBits is smaller, the wait time can be decreased. This implementation relies on the assumption that the buffer level will remain between boundaries. If the buffer level rises too much, the I²S controller is likely not removing samples from the buffer fast enough. Therefore, the number of dummy bits is decreased, increasing the rate of removal of samples. If the buffer level drops too low, the I²S controller is likely removing samples from the buffer too quickly, so the number of dummy bits is increased. In other implementations, clock drift may be adjusted by techniques other than changing the number of dummy bits. For example, the I²S clock, SCK, may be adjusted directly.

To compensate for clock drift in the I²S controller, an alternative process would be to speed up the I²S clock, SCK, periodically. For instance, the bit clock SCK may be accelerated for every one out of n samples. The clock can be changed rapidly by changing the divisor used by the clock divider 290. If, for instance, the clock divider 290 divides the incoming clock by 4 to create SCK, the clock divider 290 may abruptly change to dividing by 2 or 3 for the one out of every n samples.

Figure 11:
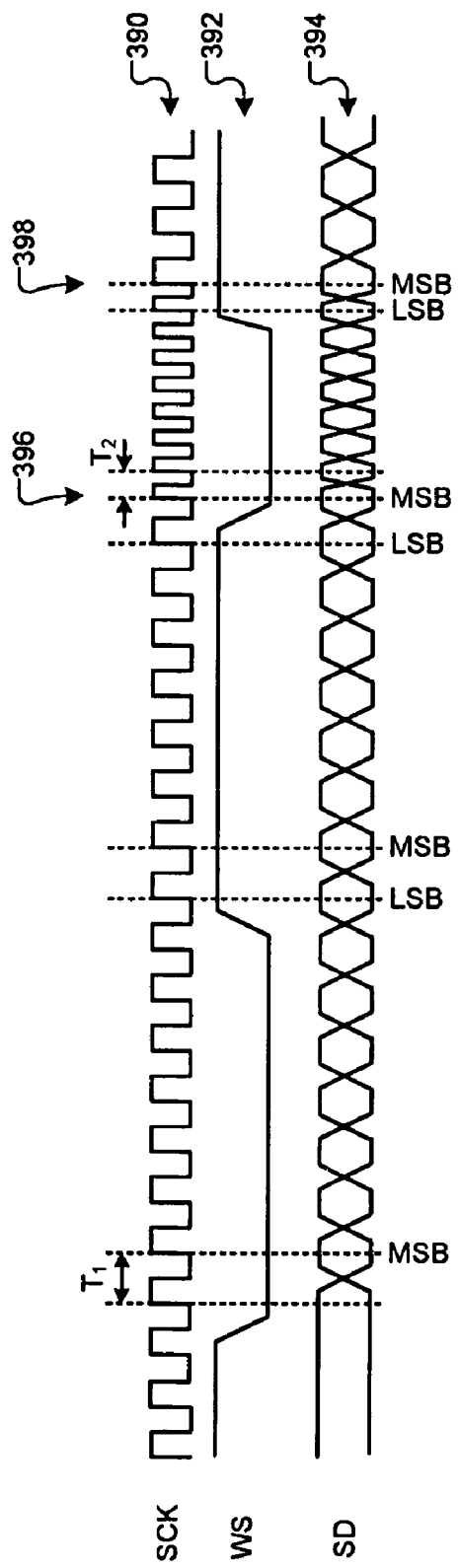
FIG. 11 is an exemplary timing diagram of an I²S bus where the period of SCK is varied.

This technique is depicted in FIG. 11, with an exemplary timing diagram of an I2S bus where the period of SCK is varied. The I2S bus includes SCK 390, WS 392, and SD 394. Each word in the example of FIG. 10 contains eight bits. SCK normally has a period of T1. During the transmission of one or more words, the period of SCK may be varied to, for example, T2. In FIG. 11, words are transmitted using an SCK having period T1 until the word beginning with MSB 396, which is transmitted with an SCK of period T2. Transmission of the next word, beginning with MSB 398, returns to an SCK of period T1. T2 may be greater than or less than T1, and will often be a fraction of T1, such as ¾ or ⅞. The fraction may remain close to one to minimize audible distortion caused by varying the sample period. The period of SCK may be changed periodically, such as for every one of four words, or by some other scheme, such as whenever clock drift is detected.

Figure 12A:
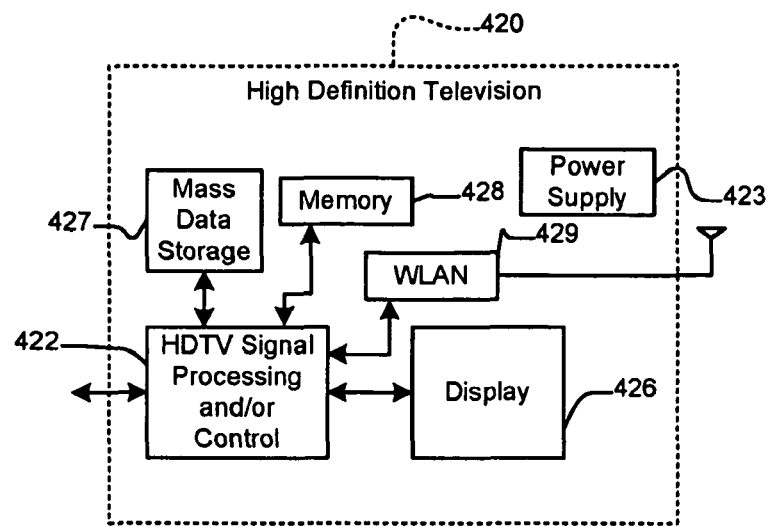
FIG. 12A is a functional block diagram of a high definition television.

Referring now to FIGS. 12A-12D, various exemplary implementations of the present invention are shown. Referring now to FIG. 12A, the present invention can be implemented in a high definition television (HDTV) 420. The present invention may be used to transmit audio data via a WLAN interface 429 or to play back received audio data. The present invention may be implemented in either or both signal processing and/or control circuits, which are generally identified in FIG. 12A at 422 or the WLAN interface 429 itself. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data, and/or perform any other type of HDTV processing that may be required.

The HDTV 420 may communicate with mass data storage 427 that stores data in a nonvolatile manner such as optical and/or magnetic storage devices. The magnetic storage device may be a mini HDD that includes one or more platters having a diameter that is smaller than approximately 1.8". The HDTV 420 may be connected to memory 428 such as RAM, ROM, low latency nonvolatile memory such as flash memory, and/or other suitable electronic data storage.

Figure 12B:
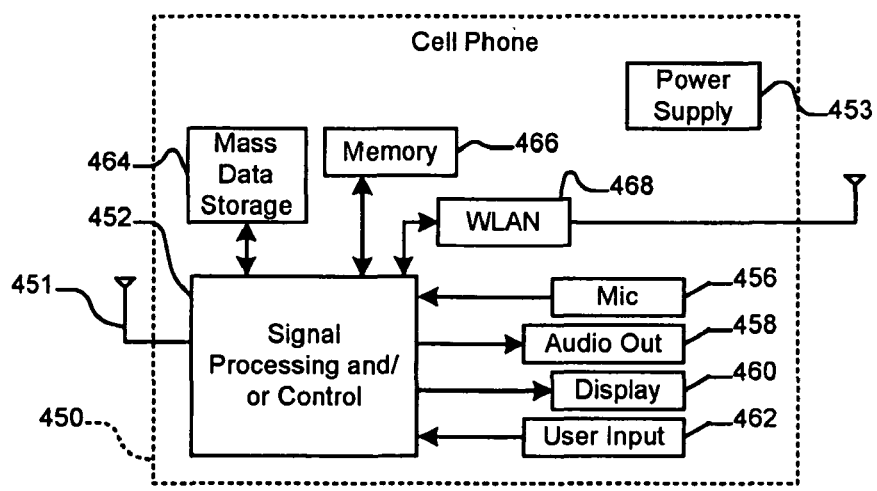
FIG. 12B is a functional block diagram of a cellular phone.

Referring now to FIG. 12B, the present invention can be implemented in a cellular phone 450 that may include a cellular antenna 451. The invention may be used to transmit data via a WLAN interface 468 or to play back received audio data. The present invention may implement and/or be implemented in either or both signal processing and/or control circuits, which are generally identified in FIG. 12B at 452, or the WLAN interface 468. In some implementations, the cellular phone 450 includes a microphone 456, an audio output 458 such as a speaker and/or audio output jack, a display 460 and/or an input device 462 such as a keypad, pointing device, voice actuation, and/or other input device. The signal processing and/or control circuits 452 and/or other circuits (not shown) in the cellular phone 450 may process data, perform coding and/or encryption, perform calculations, format data, and/or perform other cellular phone functions.

The cellular phone 450 may communicate with mass data storage 464 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 450 may be connected to memory 466 such as RAM, ROM, low latency nonvolatile memory such as flash memory, and/or other suitable electronic data storage.

Figure 12C:
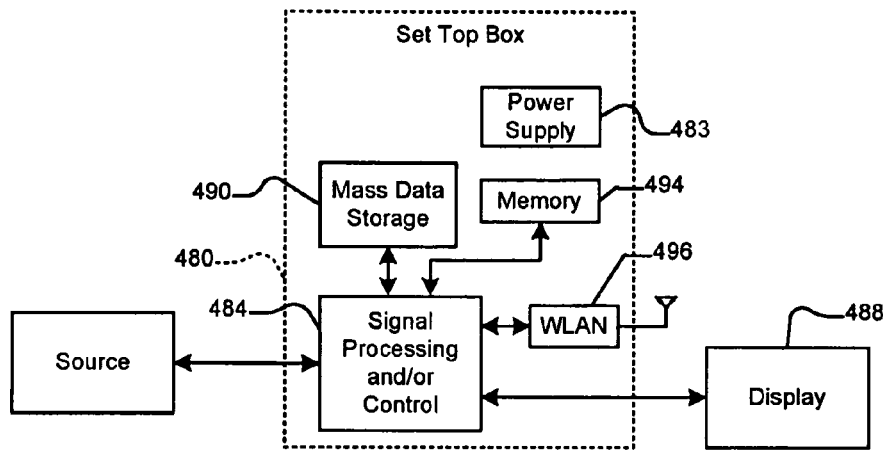
FIG. 12C is a functional block diagram of a set top box.

Referring now to FIG. 12C, the present invention can be implemented in a set top box 480. The present invention may be used to transmit data via a WLAN interface 496 or to play back received audio data. The present invention may implement and/or be implemented in either or both signal processing and/or control circuits, which are generally identified in FIG. 12C at 484 or the WLAN interface itself. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data, and/or perform any other set top box function.

The set top box 480 may communicate with mass data storage 490 that stores data in a nonvolatile manner. The mass data storage 490 may include optical and/or magnetic storage devices for example hard disk drives HDD and/or DVDs. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage.

Figure 12D:
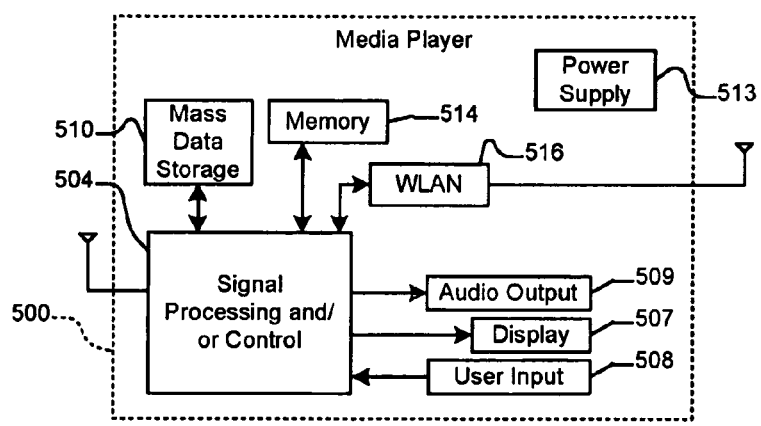
FIG. 12D is a functional block diagram of a media player.

Referring now to FIG. 12D, the present invention can be implemented in a media player 500. The present invention may allow synchronized audio playback at the media player 500. The present invention may implement and/or be implemented in either or both signal processing and/or control circuits, which are generally identified in FIG. 12D at 504, or the WLAN interface 516 itself. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 500 may be connected to memory 514 such as RAM, ROM, low latency nonvolatile memory such as flash memory, and/or other suitable electronic data storage. Still other implementations in addition to those described above are contemplated.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:
1. An audio system comprising:
an audio client device comprising:
a buffer configured to receive a stream of samples of audio data;
a clock generator configured to generate a first clock signal;
a bus controller configured to (i) read samples from the buffer for transmission across a bus using the first clock signal and (ii) serially transmit each of the samples separated by a number of dummy bits, wherein the number of dummy bits is greater than one;
a bus receiver configured to (i) receive samples from the bus controller and (ii) output a sampling clock along with each sample;
a control module configured to (i) analyze activity of the buffer and (ii) adjust the number of dummy bits to synchronize the sampling clock with a remote sampling clock based on the activity; and
a clock divider module configured to divide an internal clock signal by a divisor to create the first clock signal,
wherein the control module is configured to selectively change the divisor to modify operation of the bus controller,
wherein the control module is configured to change the divisor for transmission by the bus controller of every one out of S samples, and
wherein S is an integer greater than one; and
an access point comprising:
an audio content module configured to generate a content signal based upon characteristics of an incoming media stream;
a decoding module configured to decode the incoming media stream into an uncompressed pulse code modulation (PCM) media stream at a bit rate determined by the content signal; and
a network interface configured to wirelessly transmit the stream of samples of audio data to the audio client device based on the uncompressed PCM media stream.

2. The audio system of claim 1, wherein
each of the samples contains N bits; and
the control module is configured to initially set the number of dummy bits to N.

3. The audio system of claim 1, wherein the control module is configured to modify the number of dummy bits based on a difference between i) a quantity of samples received by the buffer and ii) a quantity of samples being read from the buffer.

4. The audio system of claim 3, wherein the quantity of samples received by the buffer accounts for samples lost prior to reaching the buffer.

5. The audio system of claim 3, wherein:
the control module is configured to decrease the number of dummy bits when a first number is greater than a second number;
the first number represents a number of samples received by the buffer during a time period; and
the second number represents a number of samples read from the buffer during the time period.

6. The audio system of claim 5, wherein:
the control module is configured to increase the number of dummy bits when the first number is less than the second number.

7. The audio system of claim 1, wherein the buffer is configured to receive samples in blocks, each block containing at least two samples.

8. The audio system of claim 7, wherein the bus controller is configured to read samples from the buffer one at a time.

9. The audio system of claim 7, wherein the control module is configured to wait to modify operation of the bus controller until the buffer has received a predetermined number of blocks.

10. The audio system of claim 9, wherein the predetermined number is determined based on granularity of modification of the bus controller.

11. The audio system of claim 1, wherein the bus is an Inter-Integrated-Circuit Sound ($I^2S$) bus, the bus controller is an $I^2S$ bus controller, and the bus receiver is an $I^2S$ bus receiver.

12. A method comprising:
generating a content signal based upon characteristics of an incoming media stream;
decoding the incoming media stream into an uncompressed pulse code modulation (PCM) media stream at a bit rate determined by the content signal;

wirelessly transmitting the uncompressed PCM media stream;
wirelessly receiving the uncompressed PCM media stream;
buffering a stream of samples of audio data from the received uncompressed PCM media stream;
generating a first clock signal;
serially transmitting buffered samples across a bus using the first clock signal, wherein a number of dummy bits are transmitted between transmission of each of the samples, the number of dummy bits being greater than one;
outputting samples received from the bus along with a sampling clock;
analyzing activity of the buffering; and
modifying the number of dummy bits to synchronize the sampling clock with a remote sampling clock based on the analyzing, wherein
the generating the first clock signal includes dividing an internal clock signal by a divisor,
the modifying includes changing the divisor for every one out of S samples transmitted by the transmitting, and
S is an integer greater than one.

13. The method of claim 12, wherein:
each of the samples contains N bits; and
the modifying initially sets the number of dummy bits equal to N.

14. The method of claim 12, wherein the modifying is based on a difference between a quantity of samples received by the buffering and a quantity of samples read by the transmitting.

15. The method of claim 14, wherein the quantity of samples received accounts for samples lost prior to the buffering.

16. The method of claim 14, further comprising:
decreasing the number of dummy bits when a first number is greater than a second number; and
increasing the number of dummy bits when the first number is less than the second number, wherein:
the first number represents a number of samples received by the buffering during a time period, and
the second number represents a number of samples read by the transmitting during the time period.

17. The method of claim 12, wherein:
the buffering is performed in blocks of samples, each block containing multiple samples;
the transmitting reads buffered samples one at a time; and
the modifying is delayed until the buffering has received a first number of blocks.

18. The method of claim 17, further comprising determining the first number based on granularity of the modifying.

19. The method of claim 12, wherein the bus is an Inter-Integrated-Circuit Sound (I²S) bus, and the transmitting is performed according to I²S.

* * * * *

UNITED STATES PATENT AND TRADEMARK OFFICE
CERTIFICATE OF CORRECTION

| | | |
|---|---|---|
| PATENT NO. | : 8,310,965 B1 | Page 1 of 1 |
| APPLICATION NO. | : 11/481137 | |
| DATED | : November 13, 2012 | |
| INVENTOR(S) | : Zhang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1024 days.

Signed and Sealed this
Eighteenth Day of November, 2014

Michelle K. Lee
*Deputy Director of the United States Patent and Trademark Office*